United States Patent [19]

Ruggles

[11] Patent Number: 4,996,790
[45] Date of Patent: Mar. 5, 1991

[54] FLOATING BAIT BUCKET
[76] Inventor: Curt Ruggles, 13625 50th Way North, Clearwater, Fla. 34620
[21] Appl. No.: 559,218
[22] Filed: Jul. 27, 1990
[51] Int. Cl.[5] .............................................. A01K 97/00
[52] U.S. Cl. .......................................... 43/55; 43/54.1
[58] Field of Search .................... 43/54.1, 55, 56, 57.1; 206/315.11

[56] References Cited
U.S. PATENT DOCUMENTS

| 3,304,645 | 2/1967 | Hardesty et al. | 43/55 |
| 3,357,127 | 12/1967 | Barradale | 43/55 |
| 3,367,061 | 2/1968 | Brandemihl et al. | 43/55 |
| 4,794,723 | 1/1989 | Arnold et al. | 43/55 |
| 4,927,041 | 5/1990 | Hepburn | 43/54.1 X |

Primary Examiner—Richard K. Seidel
Assistant Examiner—Patty E. Hong
Attorney, Agent, or Firm—Harold D. Shall

[57] ABSTRACT

A floating bait bucket of durable construction with a catamaran external hull which is perforated to allow for the flow of water therethrough. To the catamaran section is secured an intermediate element having secured thereto an upper outer element. Between the last two elements is a foamed in place layer of closed cell polyurethane foam which serves not only to provide a positive floatation mechanism but also to insulate a refreshment container which is formed in the upper element.

3 Claims, 3 Drawing Sheets

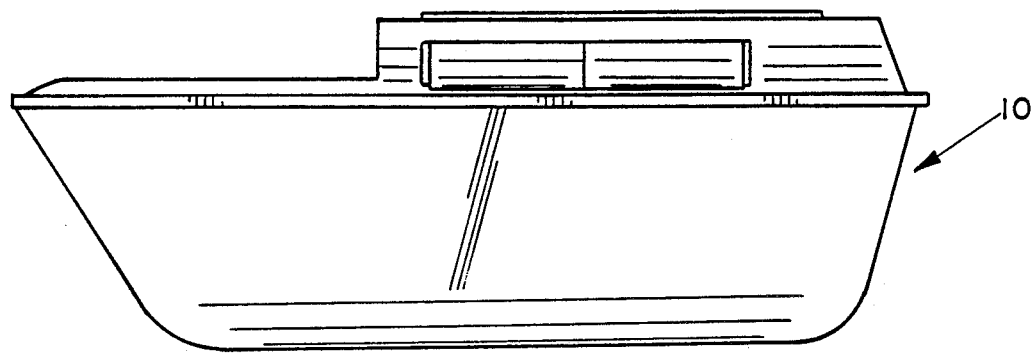
FIG_2
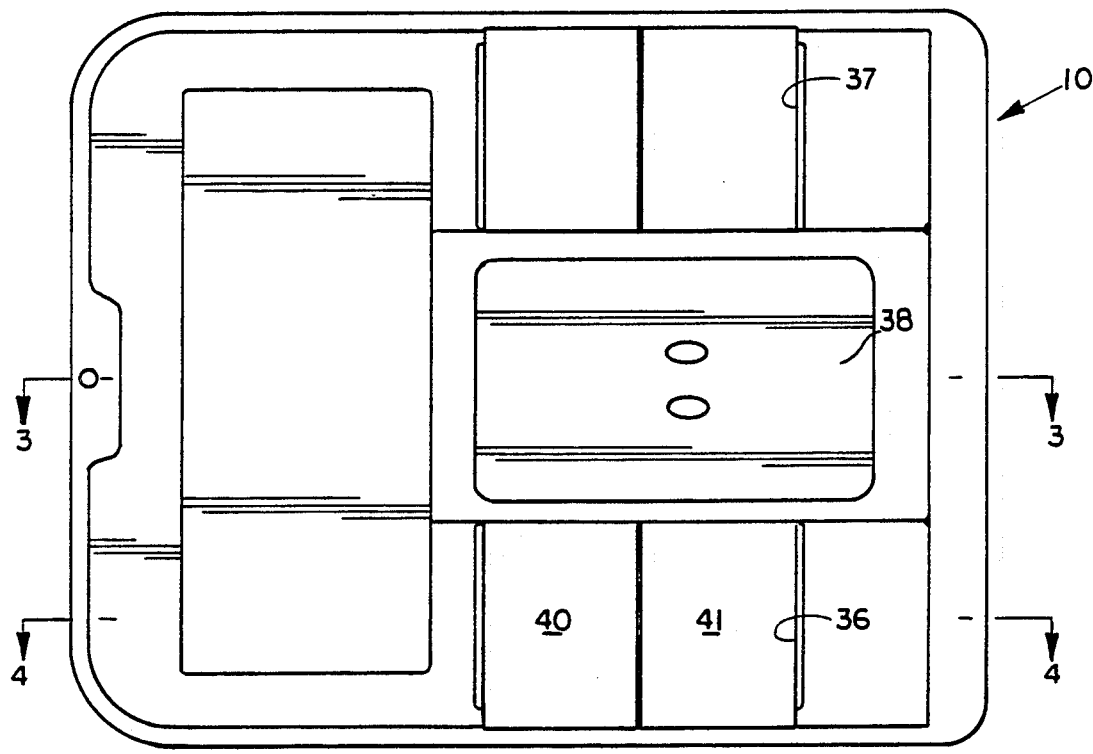
FIG_1

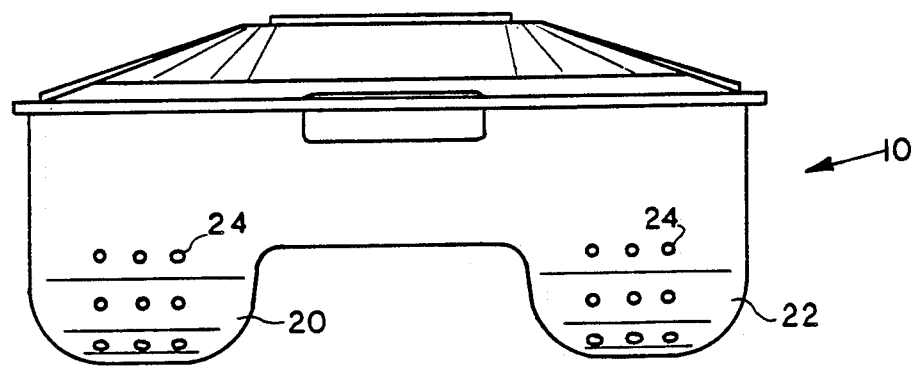
FIG_5
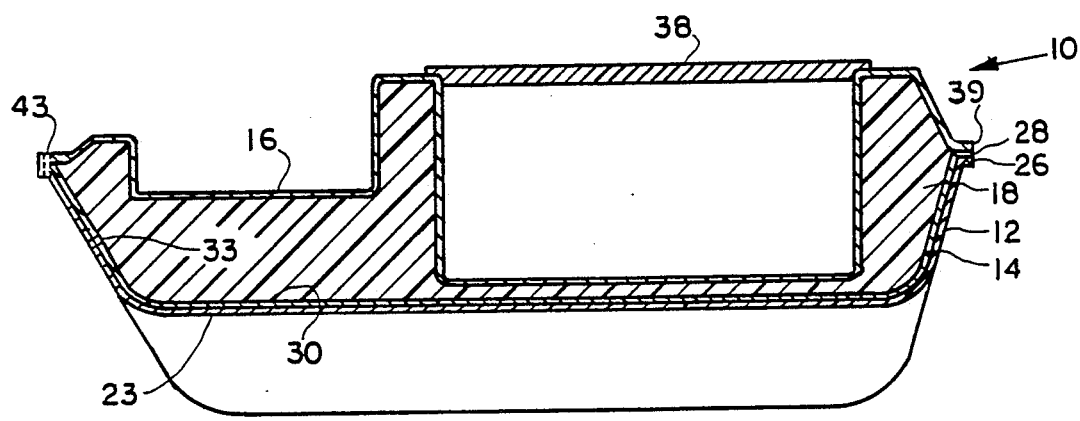
FIG_3
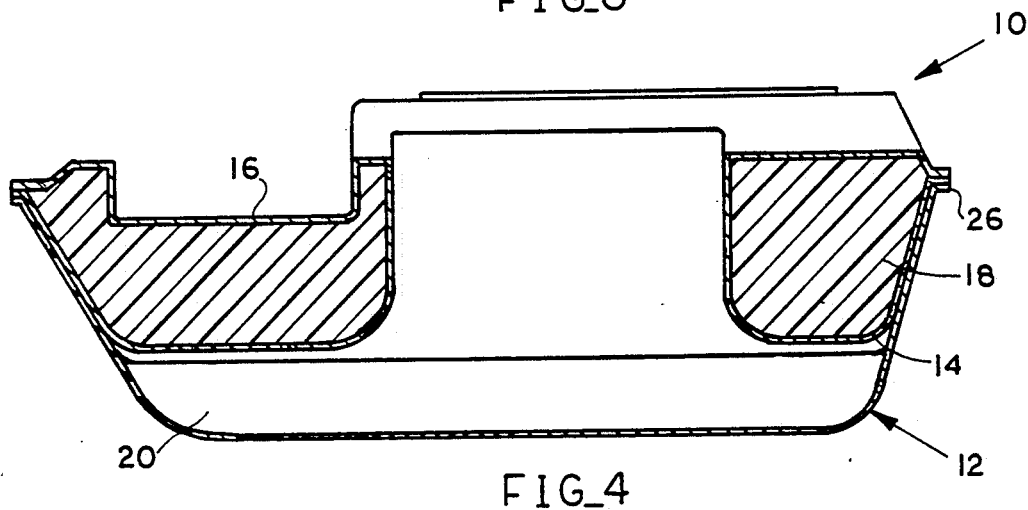
FIG_4

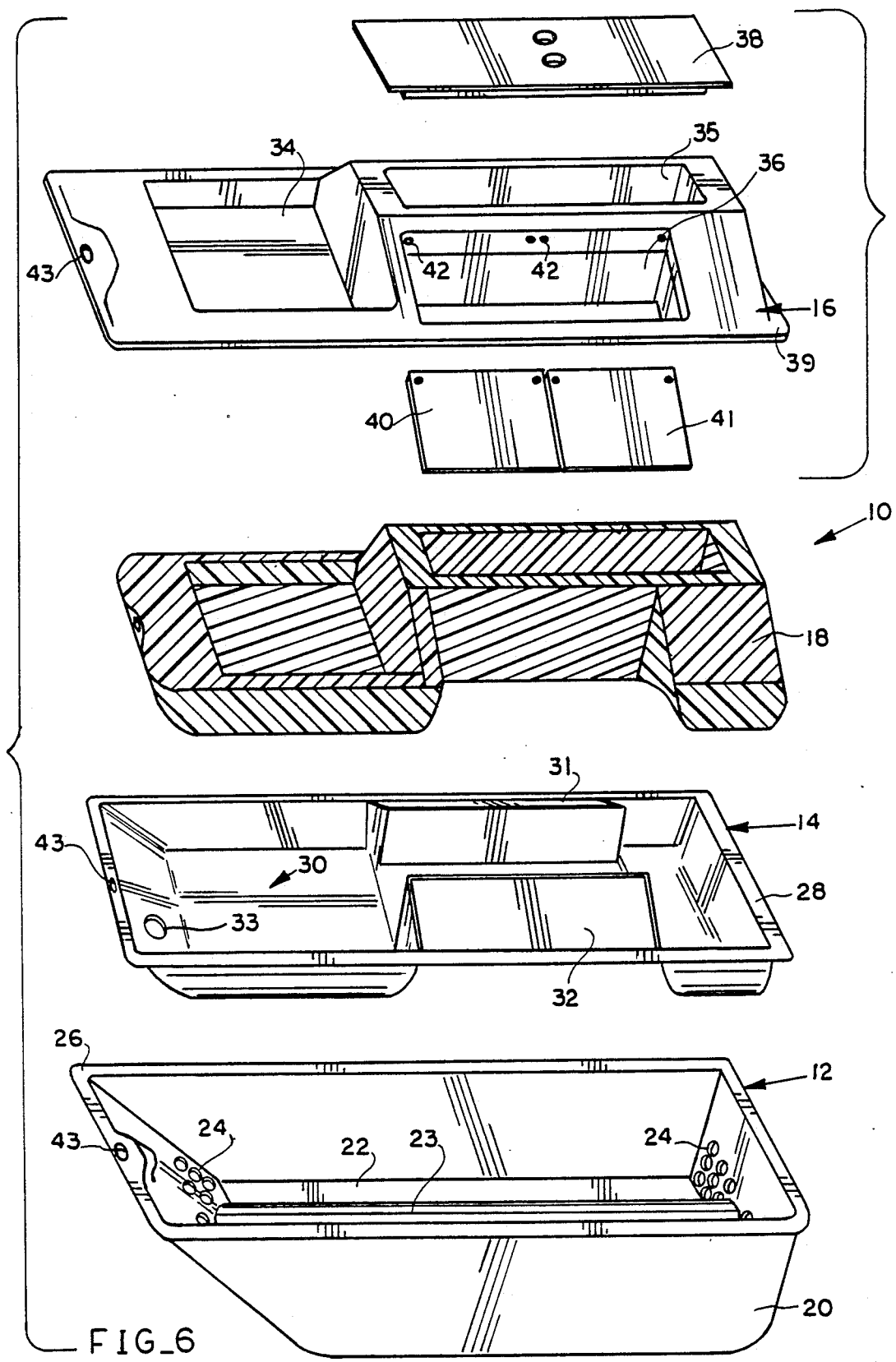
FIG_6

FLOATING BAIT BUCKET

BACKGROUND OF THE INVENTION

This invention relates generally to floating bait buckets and more particularly to a floating bait bucket of sturdy and durable construction which has live bait compartments, an insulated compartment for storing food and beverages and a tackle box storage compartment.

One form of fishing that is quite common is wade fishing, for example in the shallow water areas along the U.S. Gulf Coast where the bottom slopes gently from the shore so that a fisherman can walk a long distance out into the water. It is also done in other places as long as dangerous current and steep bottoms do not inhibit the fisherman wading ability.

The fisherman requires more than merely his fishing rod to enjoy the pastime and commonly requires bait, a change of fishing tackle and food and beverage to partake of.

PRIOR ART

U.S. Pat. No. 4,638,593 shows a fishing accessory; however, it has only a single bait compartment, is weakly constructed and it has no positive floatation material. U.S. Pat. No. 4,794,723 also shows a bait bucket but its floatation material is exposed where it can be damaged or destroyed, has only a single bait compartment and separate material to insulate the refreshment compartment.

SUMMARY OF THE INVENTION

The present invention provides a floating bait bucket of durable construction with a catamaran shaped external hull which is perforated to allow the flow of water therethrough to refresh the bait in the twin hulls of the catamaran. To the twin hull section is secured an intermediate element having secured thereto an upper, outer element. Between the intermediate element and the outer element is a foamed in place layer of closed cell polyurethane foam which serves not only to provide a positive floatation mechanism for the bucket, but also to insulate the refreshment container which is formed in the upper element. Passageways formed through the upper and intermediate element and leading separately to each portion of the catamaran hull allow the fisherman to reach into the bucket to obtain the bait contained therein. Since there are two separate compartments, the fisherman can store two kinds of bait, e.g. minnows in one side and shrimp in the other.

BRIEF DESCRIPTION OF THE DRAWINGS

FIG. 1 is a plan view of a bucket according to this invention;

FIG. 2 is a side elevational view of the device of FIG. 1;

FIG. 3 is a view taken along the lines 3—3 of FIG. 1;

FIG. 4 is a view taken along the lines 4—4 of FIG. 1;

FIG. 5 is a front elevational view of the device of FIG. 1; and

FIG. 6 is an exploded side view of the device of FIG. 1.

DETAILED DESCRIPTION

A floating bait bucket 10 is formed of three plastic structural elements 12, 14 and 16 and a floatation element 18 as seen in FIGS. 3, 4 and 6. The three structural elements 12, 14 and 16 are made of acrylonitrile butadiene styrene plastic, commonly referred as ABS and is purchased in flat sheet form from Commercial Plastics, Clearwater, Fla.

The twin hull catamaran section 12 has laterally spaced twin hull sections 20 and 22 separated by an upstanding center portion 23, most clearly seen in FIGS. 5 and 6, which hulls have been formed by cutting the ABS sheet to the desired shape, warming the ABS plastic sheet, and then pulling it down on a die by the use of vacuum; commonly referred to as vacuum forming. Flow through openings 24 are then formed in the ends of each of the twin hulls of the catamaran sides of section 12 The entire periphery of the section 12 has a lip 26 formed thereabout for a purpose to be hereinafter described.

The intermediate structural element 14 is likewise cut to size from ABS sheet and then vacuum formed on a die. The entire periphery of the element 14 has a lip 28 which matches in size and shape the lip 26 on the section 12. The element 14 also has a depressed center section 30, two opposed lateral openings 31 and 32 formed near the forward taper thereof.

The upper structural element 16 has a depressed forward section 34 and a depressed rearward section 35 and two opposed lateral openings only one of which can be seen at 36 in FIG. 6, however there is one opposed to this opening which can be seen in FIG. 1. The upper structural element 16 likewise has a lip 39 which matches in size and shape the lips 26 and 28.

The depression 34 serves to hold a tackle box or loose fishing equipment, while the depressed rearward section 35 has a lid 38 which fits therein making the depression 38 satisfactory to store food, beverages or the catch of the day.

The upper section 16 and intermediate section 14 are first assembled with their lips in engagement. They are inverted upside down from that shown in FIG. 6 and their lips bonded with a suitable bonding agent such as "Weld-On 1707" obtainable from said Commercial Plastics in Clearwater, Fla. The reason for inverting these sections 14 and 16 is to allow a two part isocyenate and polyurethane foam, obtainable from Foamcraft Inc. of Sarasota, Fla. to flow into the opening 33 and down to the bottom of the structure. The foam immediately forms in to a closed cell polyurethane foam 18 which fills the spaces between the upper 16 and intermediate sections and provides for insulation and positive flotation of the bucket 10.

The bonded upper 16 and intermediate section 14 are now bonded to the lips of the lower structural element 12 and flaps 40 and 41 made of "Virgin Neoprene" with a durameter hardness of approximately 40 are then secured to mating holes 42 in the upper section 16, which flaps provide an opening for the openings 36 and 37.

As seen in FIG. 3, the intermediate structural element 14 is in contact with the center portion of the bottom member 12 between the catamaran hull portions 20 and 22 and is likewise bonded thereto at the same time that the lip 28 of the intermediate section 14 is bonded to the lip of the bottom member 12 to form an intergral rigid and strong structure. It should be noted that the hull portions 20 and 22 are entirely separate from each other and that bait in one section will not get into the other section.

When the spaces between the upper 16 and intermediate sections are filled with the foamed material, this not only provides for very positive flotation, but also provides for good insulation of the rearward section 35.

A hole 43 is formed in the structural member at the front end thereof for attaching a line, thereto; the other end of the line being suitably secured to the individual using the device to teather the same.

Although the above description relates to a presently preferred embodiment, numerous modifications may be made therein without departing from the spirit of the invention and as defined in the following claims.

What is claimed is:

1. A floating bait bucket comprising in combination;
   (a) a catamaran shaped outer hull with water flow openings formed therein,
   (b) an intermediate member bonded peripherally and medially to said catamaran hull to thereby separate the catamaran hull into two separate sections,
   (c) an upper member peripherally bonded to said intermediate member and otherwise spaced therefrom,
   (d) a polyurethane foam insulating and floatation section filling the space between the upper and intermediate members,
   (e) a first opening formed laterally in said upper member in registration with an opening in said intermediate member for providing access to one section of said catamaran hull,
   (f) a second opening for said upper member laterally opposite to said first opening for providing access to the other sectIon of said catamaran hull.

2. A bucket according to claim 1 including a depression in said upper member surrounded on all sides and the bottom by said foam section to form an insulating depression and having a lip therefore.

3. A bucket according to claim 1 wherein said first and said second openings are covered with flaps of virgin neoprene with a durometer hardness of approximately 40.

* * * * *